US009493102B2

(12) United States Patent
Tang

(10) Patent No.: US 9,493,102 B2
(45) Date of Patent: Nov. 15, 2016

(54) MULTI-FUNCTIONAL TOUCH COOLING CUP HOLDER

(75) Inventor: Wenji Tang, Shenzhen (CN)

(73) Assignee: eMoMo Technology Co., Ltd., Shenzhen (CN)

( * ) Notice: Subject to any disclaimer, the term of this patent is extended or adjusted under 35 U.S.C. 154(b) by 364 days.

(21) Appl. No.: 13/386,318

(22) PCT Filed: Dec. 13, 2010

(86) PCT No.: PCT/CN2010/079690
§ 371 (c)(1),
(2), (4) Date: Jan. 20, 2012

(87) PCT Pub. No.: WO2012/037756
PCT Pub. Date: Mar. 29, 2012

(65) Prior Publication Data
US 2012/0217772 A1 Aug. 30, 2012

(30) Foreign Application Priority Data
Sep. 25, 2010 (CN) ...................... 2010 2 0541343 U

(51) Int. Cl.
F25B 21/02 (2006.01)
A47C 7/62 (2006.01)
(Continued)

(52) U.S. Cl.
CPC .................. B60N 3/104 (2013.01); A47C 7/68 (2013.01); F25B 21/02 (2013.01); F25D 31/007 (2013.01); A47G 23/02 (2013.01); A47J 36/2483 (2013.01); F25B 21/04 (2013.01); F25D 2331/809 (2013.01)

(58) Field of Classification Search
CPC .................. A47G 23/02–23/0266; B60N 3/10; B60N 3/104; B60N 2/0228; A61H
(Continued)

(56) References Cited

U.S. PATENT DOCUMENTS 3,346,812 A * 10/1967 McKenna et al. ........... 455/90.3
4,809,180 A * 2/1989 Saitoh ............................ 701/49
(Continued)

FOREIGN PATENT DOCUMENTS

CN 2052513 U 2/1990
CN 2730684 Y 10/2005
(Continued)

OTHER PUBLICATIONS

International Search Report and Written Opinion of the International Searching Authority.

*Primary Examiner* — Ryan J Walters
*Assistant Examiner* — Antonio R Febles
(74) *Attorney, Agent, or Firm* — Bass, Berry & Sims PLC

(57) ABSTRACT

A multi-functional touch cooling cup holder includes an annular socket that can accommodate a beverage can or water bottle. At the top of the socket there is a bended edge that is larger than a cylinder of the socket and at the bottom of the socket there is an annular bottom cap. On the cylinder of the socket there is a vertical slot, within which there is a control circuit of the cup holder that is equipped with IC chip. A thermal radiator is installed under the bottom cap. The radiator contains multiple paralleled radiation fins and a cooling fan. A thermoelectric cooler that is installed between the thermal radiator and the thermal conductor and is electrically connected with the control circuit of the cup holder. The cooling side of the thermoelectric cooler faces up, the thermal side faces down and is adhered to the top of the thermal radiator.

20 Claims, 5 Drawing Sheets

(51) Int. Cl.
  *B60N 3/10*   (2006.01)
  *F25D 31/00*  (2006.01)
  *A47C 7/68*   (2006.01)
  *A47G 23/02*  (2006.01)
  *F25B 21/04*  (2006.01)
  *A47J 36/24*  (2006.01)

(58) Field of Classification Search
  CPC .............. 2201/0149;A47J 36/2461–36/2472; F25B 21/02; F25D 31/007; B65D 81/38; B65D 81/3876
  USPC ...... 62/3, 2, 3.3, 457.1, 457.3, 457.4; 133/3, 133/2, 3.3, 457.1, 457.3, 457.4; 220/737, 220/739
  See application file for complete search history.

(56) References Cited

U.S. PATENT DOCUMENTS

| | | | | |
|---|---|---|---|---|
| 5,834,834 | A * | 11/1998 | Lee et al. | 257/679 |
| 6,121,585 | A * | 9/2000 | Dam | 219/438 |
| 6,282,906 | B1 * | 9/2001 | Cauchy | 62/3.3 |
| 6,449,958 | B1 * | 9/2002 | Foye | 62/3.2 |
| 7,089,749 | B1 | 8/2006 | Schafer | |
| 7,766,293 | B2 | 8/2010 | Seidl et al. | |
| 2001/0052153 | A1 * | 12/2001 | Schwartz et al. | 5/905 |
| 2005/0161558 | A1 * | 7/2005 | Stahl et al. | 248/146 |
| 2006/0230229 | A1 * | 10/2006 | Getzinger | 711/118 |
| 2007/0247836 | A1 * | 10/2007 | Seidl et al. | 362/154 |
| 2009/0038317 | A1 * | 2/2009 | Otey | 62/3.2 |
| 2010/0224639 | A1 * | 9/2010 | Peng | 220/694 |
| 2010/0258268 | A1 * | 10/2010 | Li | 165/64 |
| 2011/0216017 | A1 * | 9/2011 | Chou et al. | 345/173 |
| 2012/0049030 | A1 * | 3/2012 | Tussy | 248/311.2 |
| 2012/0075842 | A1 * | 3/2012 | Goto | 362/154 |

FOREIGN PATENT DOCUMENTS

| | | | | |
|---|---|---|---|---|
| DE | 29601008 U1 | 3/1996 | | |
| JP | 05294191 A | * 11/1993 | ............ | B60R 16/02 |
| JP | 2002147918 A | 5/2002 | | |
| JP | 2008-260388 | * 10/2008 | ............ | B60N 3/10 |
| WO | WO 9726490 A1 | * 7/1997 | ............ | F25B 21/04 |
| WO | WO 03105640 A1 | * 12/2003 | ............ | F25D 31/007 |

* cited by examiner

MULTI-FUNCTIONAL TOUCH COOLING CUP HOLDER

PRIORITY STATEMENT

This application is the national phase under 35 U.S.C. §371 of PCT International Application No. PCT/CN2010/079690 which has an International filing date of Dec. 13, 2010, which designated the United States of America, and which claims priority to Chinese Patent Application 201020541343.6 filed Sep. 25, 2010, the entire contents of which are hereby incorporated herein by reference.

FIELD

At least one embodiment of the present invention relates to a multi-functional touch cooling cup holder that is especially suitable for chairs including massage armchairs, sofas and seats in coaches, airplanes, ships, theaters and cinemas.

BACKGROUND

Although cup holders have long been equipped in seats, such as massage armchairs, sofas and seats in coaches, airplanes, ships, theaters and cinemas, there are no cup holders with a cooling function that provides people with more convenience. Therefore, when people would like to have cold drinks or water in the summer, they have to use a refrigerator to cool the beverages or water at home and go back and forth between the refrigerator and their massage armchair or sofa frequently. If they are in a coach or a ship, theater or cinema, they have to go to a service station or convenience store for cold drinks, both of which could be quite inconvenient or even annoying especially on a hot summer day.

Furthermore, as people's living standards continue to improve, the majority of seats in coaches, ships, airplanes, massage armchairs and certain type of chairs are equipped with a control unit, for example, a built-in push button unit, to adjust a reclining angle of a backrest and/or a height of a seat of a chair. However, if the armrest of the seat is already equipped with a cup holder, and then a control unit is added, it is easy to spill the contents of the drinks into the control unit and consequently cause a malfunction of the control unit. Furthermore, because the push button control unit is uncovered, dust and bacteria are easily gathered and may transmit diseases while in use. Further, push button control units usually have a limited life span, and it is difficult to be replace the units once malfunction has occurred, which would result in trouble repairing the device.

SUMMARY

A purpose of the present invention is to provide a cup holder that is able to cool a drink at any time. The cup holder may be installed in an armrest of various seats, or between a driver's seat and a passenger seat in a car, for example, or even embedded in a table at home, so that people will be able to enjoy refreshing cold beverages and/or water at any time. The seats mentioned herein may include, but are not limited to, chairs, massage armchairs, sofas and seats in airplanes, ships, theaters, cinemas, and the like.

In an exemplary embodiment, apart from cooling beverages and/or water at any time in a more convenient way, the multi-functional touch cooling cup holder may also enable adjustment of the height of a seat, an angle of a backrest and/or footrest of the seat, control an intensity of the vibration in a massage chair, kneading and/or air cell massage, heat treatment, and/or control of a stereo system through multiple touch control units on the cup holder, making the usage and operation of the seat more convenient.

In an example embodiment, the multi-functional touch cooling cup holder may include a cup holder which is an annular socket that can accommodate a beverage can or a water bottle. At the top of the socket there may be a bended edge that is bigger than the cylinder of the socket. At the bottom of the socket there may be an annular bottom cap. The cylinder of the socket may include a vertical slot, within which there is a control circuit of the cup holder that is equipped with an IC chip.

In an example embodiment, the multi-functional touch cooling cup holder may include a thermal radiator installed under the bottom cap and which contains multiple paralleled radiation fins and a cooling fan.

A thermal conductor may be in the shape of a shallow plate turned upside down. An edge of the plate may be embedded in an outer edge of the bottom cap's bore, and its bottom side may be adhered to the cooling side of the thermoelectric cooler.

The thermoelectric cooler may be installed between the thermal radiator and the thermal conductor and include an electric connection with a control circuit of the cup holder. A cooling side of the thermoelectric cooler faces up, and a thermal side faces down and is adhered to the top side of the radiator.

In an example embodiment, the multi-functional touch cooling cup holder may be installed in an armrest of various seats or between a driver's seat and a passenger seat in a car, or even embedded in the a table at home, for example. In use, a beverage can, water bottle or a cup may simply be placed on the thermal conductor of the cup holder and the power switched on so the thermoelectric cooler will conduct coolness to the drinks in the can, bottle or cup through the thermal conductor, and consequently cool the drinks.

In an example embodiment, the multi-functional touch cooling cup holder may include a boss at the bottom of the cup holder. The boss may be equipped with an annular LED tube. Inside the tube there may be LED lamps of two to three different colors. Each of the LED lamps has an electric connection with the control circuit of the cup holder.

According to an exemplary embodiment, the cooling cup holder may include a transparent cover with a bended edge that is coated outside the bended edge of the cup holder, and a touch switch board installed between the bended edges of the cover and the cup holder's bended edge. The touch switch board may include several touch switches that control the cooling, and changing the color of LED lamps in an LED. Each of these switches may have an electric connection with the control circuit of the cup holder.

The control circuit mentioned above may also include a power module, a cooling module, a touch panel, a touch control MCU and an output control MCU. The power module converts the electric supply to the electric voltage required by the MCU and output equipment. The touch control MCU then examines the touch switches and transmits signals identified to the output control MCU by means of $I^2C$. After the output control MCU receives the signals identified by the touch control MCU, the cooling module begins to work.

In an example embodiment, the multi-functional touch cooling cup holder may include an additional set of touch switches on the touch switch board, each of the switches being separately electrically connected with a control circuit of a seat in which the cup holder is installed. The control circuit of the seat contains sub-circuits that control, for example, the height of the seat, adjustment of the angle of the seat's backrest and footrest, the intensity of vibration, kneading and air cell massage, heat treatment, as well as control of the stereo system. Each of these sub-circuits is separately connected with the power module and the output control MCU and works under the control of the output control MCU.

During use, the corresponding switches on the switch board may simply be touched to achieve the designated functions, such as adjusting the height of the seat, the angle of the seat's backrest and footrest, the intensity of the vibration, kneading and air cell massage, the heat treatment and control of the stereo system.

Because the cup holder can be installed in an armrest of various seats or between a driver's seat and a passenger seat in a car, or even embedded in a table at home, for example, it is quite easy and convenient for people to have cold drinks at any time, including during the summer.

The LED tube installed at the bottom of the cup holder works as an indicator/locator in the dark, and the color-changing function can enhance the decorative effects of the cup holder.

Because there is a touch switch board installed on the cup holder, and each touch switch on the touch switch board has an electric connection with the control circuit of the seat, it is very handy to operate various functions of the seat through the cup holder, making the cup holder multi-functional. Furthermore, the integration of various functions and control into the same cup holder saves space and materials, which consequently further simplifies the structure of the seat in which the cup holder is installed and reduces costs.

Because the touch switch board is sealed between the bended edges of the cover and the cup holder, it is very effective in avoiding the incursion of moisture and the transmission of diseases due to the gathering of dust and/or bacteria while in use. Also, because the life span of use of touch switches is much longer than that of micro touch switches, the cost of maintenance is greatly reduced.

DETAILED DESCRIPTION

Figure 1:
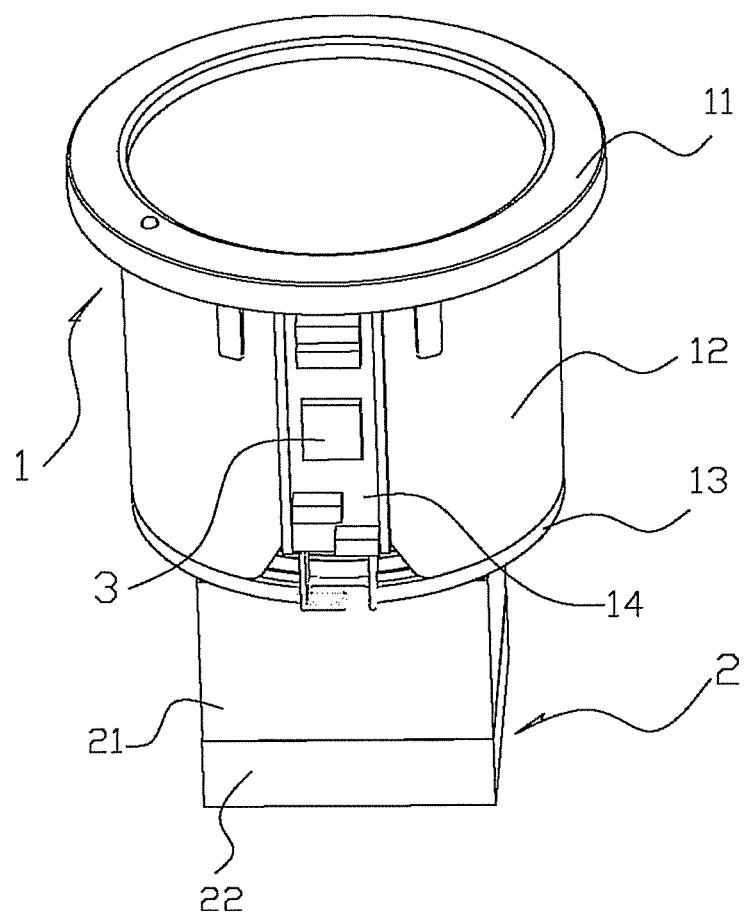
FIG. 1 is a 3-D illustration of an example embodiment of a multi-functional touch cooling cup holder according to the present invention.
Figure 2:
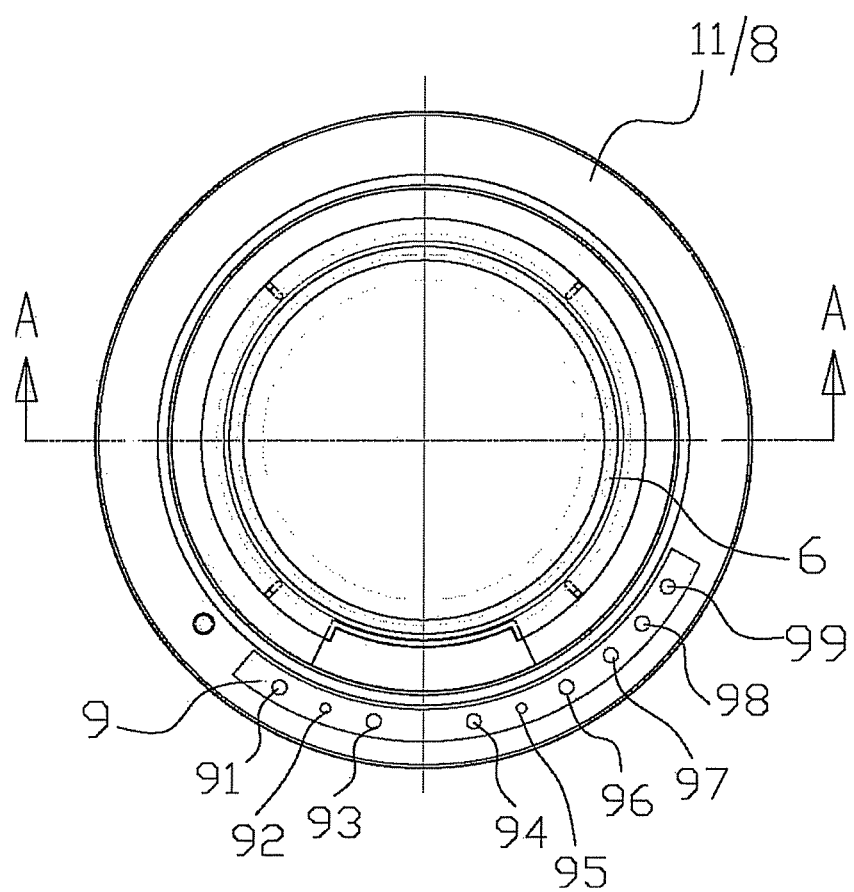
FIG. 2. is an enlarged top view of FIG. 1.
Figure 3:
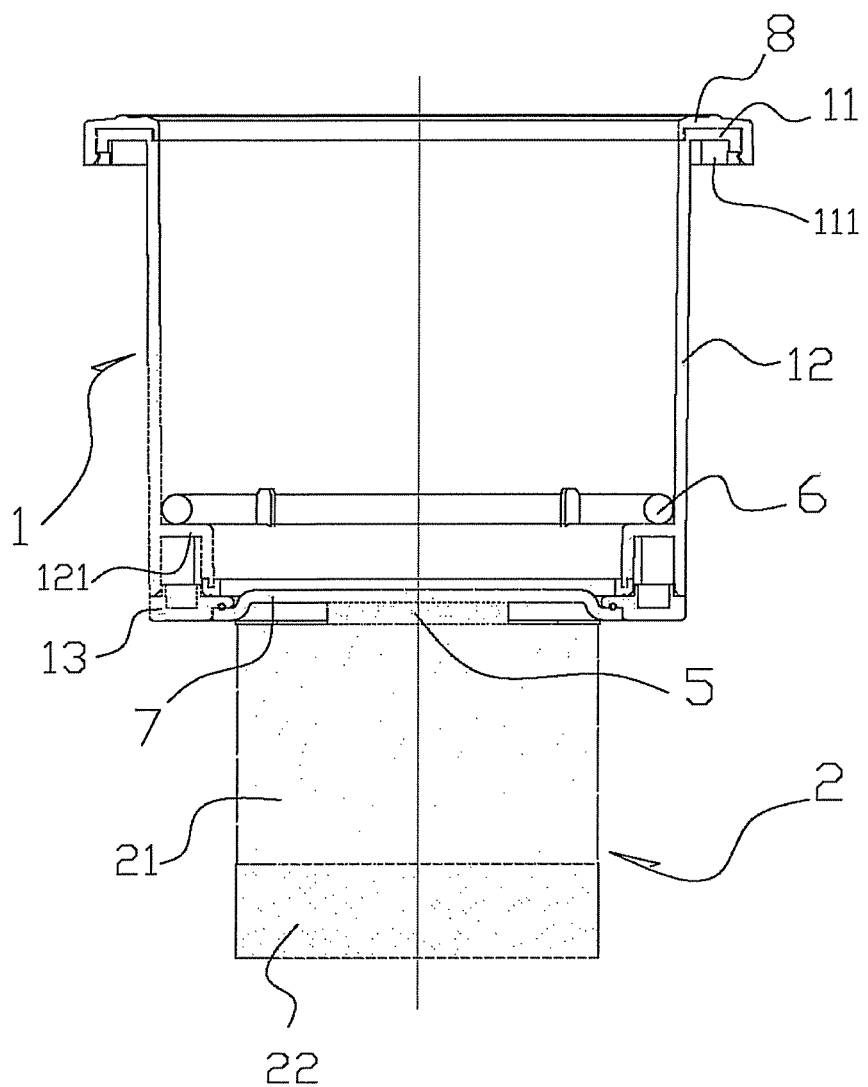
FIG. 3. is a cross-section along line A-A of FIG. 2.

In an exemplary embodiment shown in FIGS. 1, 2 and 3, the multi-functional touch cooling cup holder includes a cup holder 1. The cup holder 1 has an annular socket 12 that can accommodate a beverage can or a water bottle. At the top of the socket 12 there is a bended edge 11 that is larger than the cylinder of the socket 12. At the bottom of the socket 12 there is an annular bottom cap 13. On the cylinder of the socket 12 there is a vertical slot 14 and within the slot 14 there is a cup holder control circuit that is equipped with an IC chip 3.

A thermal radiator 2 is installed under the bottom cap 13. The thermal radiator 2 contains multiple paralleled radiation fins 21 and a cooling fan 22.

A thermal conductor 7 (FIG. 3), is in the shape of a shallow plate turned upside down. An edge of the plate is embedded in an outer edge of a bore of the bottom cap 13, and its bottom side is adhered to a cooling side of a thermoelectric cooler 5.

The thermoelectric cooler 5, which is installed between a thermal radiator 2 and the thermal conductor 7, is electrically connected with the control circuit of the cup holder. The cooling side of the thermoelectric cooler 5 faces up (toward the socket), and the thermal side faces down and is adhered to the top side of the radiation fins 21 of the thermal radiator 2.

Furthermore, there is a boss 121 installed inside the bottom of the socket 12 of the cup holder. An annular LED tube 6 is installed on the boss 121, and within the LED tube 6 there are LED lamps of two to three different colors. Each of the LED lamps is electrically connected with the control circuit of the cup holder separately.

In an exemplary embodiment shown in FIGS. 1-4, the cooling cup holder may include a transparent cover 8 with bended edge that is coated outside the bended edge 11 of the cup holder. Furthermore, a touch switch board 9 is installed between the transparent cover 8 with bended edge and the bended edge 11 of the cup holder. The touch switch board 9 has several touch switches, including switch 91 for cooling, switch 92 for the LED tube 6 and a switch 93 for changing the color of the LED lamps. Each of these switches is electrically connected with the control circuit of the cup holder 4.

A wire for electric connection can be coiled through the slot 111 under the bended edge 11 of the cup holder to the slot 14 on the cylinder of the socket 12 and then connected with a power supply. An LED indicator light is installed under each of the touch switches to illuminate the function indication icons on a cover with the bended edge. There may also be a lock button installed between the edges of the cover with the bended edge and the cup holder, and a corresponding indicating light will illuminate once the button is triggered. As a result, all the touch switches can be locked to avoid any errant or unintended operations.

Figure 4:
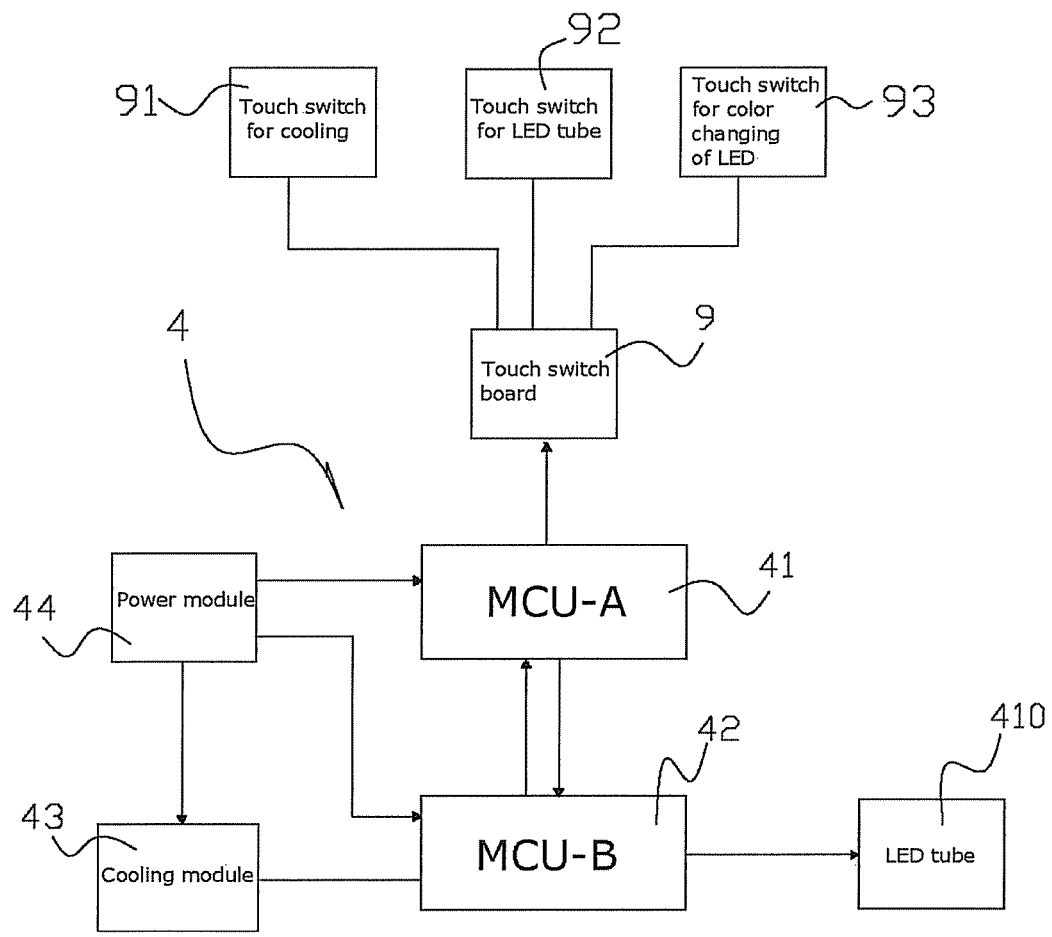
FIG. 4. is a block diagram of an example control circuit of the claimed device.

As shown in FIG. 4, the control circuit 4 includes a power module 44, a cooling module 43, a touch switch board 9, a touch control MCU-A 41 and an output control MCU-B 42. The power module 44 converts the electric supply to the electric voltage that is required by MCU and output equipment, touch control MCU-A 41 then examines the touch switches and transmits the signals identified to the output control MCU-B 42 in the means of $I^2C$. Finally, the output control MCU-B 42 receives the signals identified by touch control MCU-A 41, and consequently controls the operation of the cooling module 43 and the LED tube 410.

Figure 5:
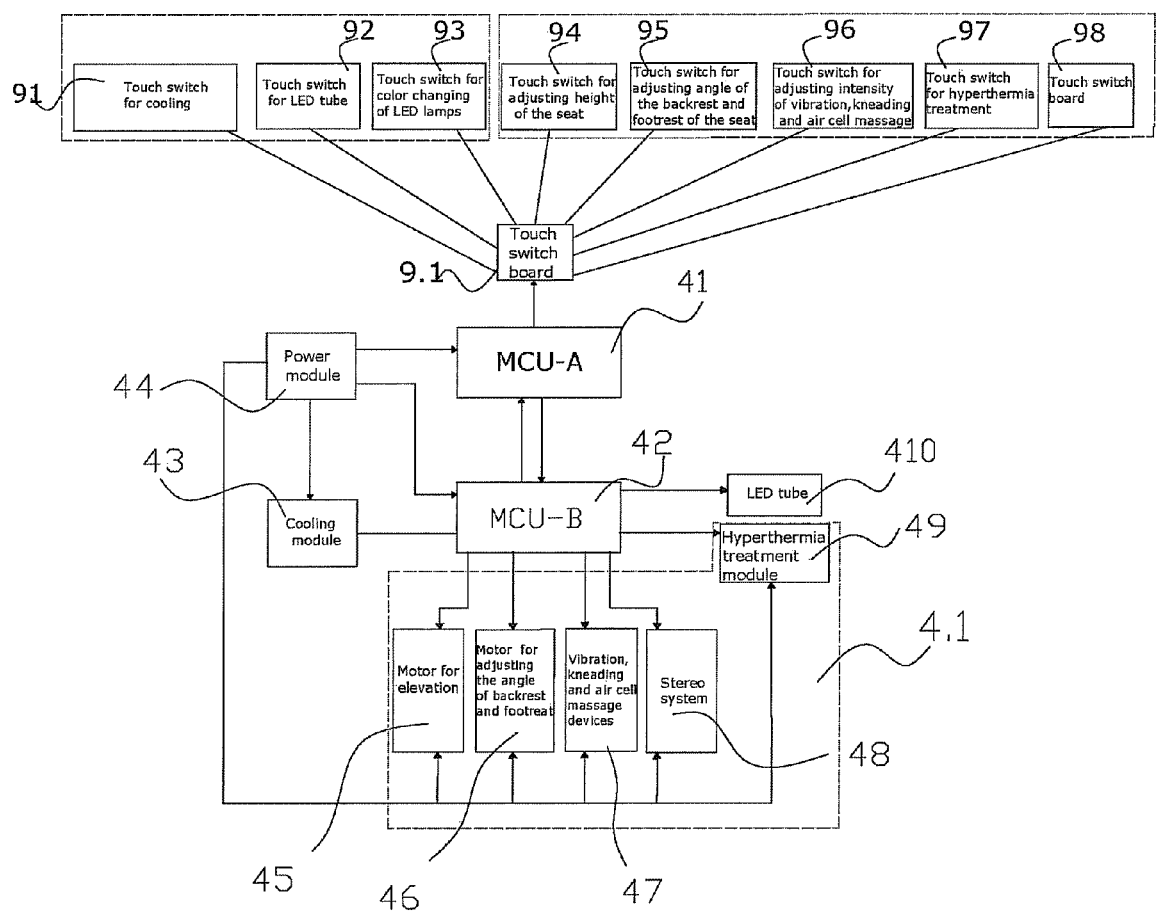
FIG. 5. is a block diagram of an example control circuit of the claimed device.

In an exemplary embodiment shown in FIG. 5, there may be an additional set of touch switches on the touch switch board 91, which includes switch 94 that controls the height of the seat, a switch 95 that adjusts the angle of the seat's backrest and/or footrest, a switch 96 that controls the vibration, kneading and/or air cell massage, a switch 97 that controls heat treatment and a switch 98 that controls a stereo system. Each of the switches 94-98 is electrically connected with the control circuit of the seat 41, separately. The control circuit of the seat 41 includes a sub-circuit 45 that controls the height of the seat, a sub-circuit 46 that controls the angle of the seat's backrest and/or footrest, a sub-circuit 47 that controls the vibration, kneading and/or air cell massage, a sub-circuit 48 that controls the stereo system and a sub-circuit 49 that controls a heat treatment module. Each of the sub-circuits 45-49 is separately connected with the power module 44 and the output control MU-B 42 and works under the control of the output control MCU-B 42.

During operation, users will only need to touch the corresponding switches to achieve the control of various functions of the seat.

Example embodiments being thus described, it will be obvious that the same may be varied in many ways. Such variations are not to be regarded as a departure from the spirit and scope of the present invention, and all such modifications as would be obvious to one skilled in the art are intended to be within the scope of the following claims.

The invention claimed is:

1. A multi-functional touch cooling cup holder, comprising:
a cylindrical cup holder having an annular socket defining a hollow interior space to accommodate a container;
a bended edge at the top of the annular socket, the bended edge having a diameter larger than a diameter of the annular socket;
an edge slot defined by the bended edge and the annular socket;
at least one touch switch on a surface of the bended edge;
a vertical slot in an exterior surface of the annular socket, wherein the vertical slot intersects with the edge slot;
a control circuit within the vertical slot, wherein the control circuit is in electrical communication with the at least one touch switch;
an annular bottom cap at the bottom of the annular socket, wherein the annular bottom cap is separate and distinct from the annular socket;
a thermal radiator installed under the annular bottom cap, the thermal radiator having multiple parallel radiation fins and a cooling fan; and
a thermal conductor separate and distinct from the annular socket and not in direct contact with the annular socket, the thermal conductor having an edge embedded in an outer edge of a bore of the annular bottom cap, a top surface exposed to the hollow interior space, and a bottom surface adhered to a cooling side of a thermoelectric cooler, wherein the thermoelectric cooler is installed between the thermal radiator and the thermal conductor, the thermoelectric cooler being electrically connected with the control circuit.

2. The multi-functional touch cooling cup holder of claim 1, wherein the a cooling side of the thermoelectric cooler faces upwardly toward the annular socket and a thermal side of the thermoelectric cooler faces downwardly and is adhered to a top side of the thermal radiator.

3. The multi-functional touch cooling cup holder of claim 1, further including a boss at the bottom of the annular socket of the cup holder, the boss being equipped with an annular LED tube, wherein the tube includes LED lamps of at least two different colors and each of the LED lamps has a separate electric connection with the control circuit of the cup holder.

4. The multi-functional touch cooling cup holder of claim 1, further including a transparent cover over the bended edge.

5. The multi-functional touch cooling cup holder of claim 4, wherein each touch switch has a separate electrical connection with the control circuit of the cup holder.

6. The multi-functional touch cooling cup holder of claim 5, wherein the control circuit includes a power module, a cooling module, a touch panel, a touch control MCU and an output control MCU, the power module being configured to convert an electric supply to an electric voltage required by the MCU and output equipment.

7. The multi-functional touch cooling cup holder of claim 6, wherein the touch control MCU is configured to receive signals from each touch switch and transmit signals to the output control MCU by means of an inter-integrated circuit.

8. The multi-functional touch cooling cup holder of claim 7, further including a boss at the bottom of the annular socket of the cup holder, the boss being equipped with an annular LED tube, wherein the output control MCU is configured to receive the signals transmitted by the touch control MCU and controls operation of the cooling module and the LED tube.

9. The multi-functional touch cooling cup holder of claim 5, wherein at least one electrical connection is a wire within the vertical slot and edge slot.

10. The multi-functional touch cooling cup holder of claim 1, wherein the thermal conductor is in the shape of a shallow plate turned upside down.

11. A massage chair including the multi-functional touch cooling cup holder of claim 1, the chair comprising a set of touch switches on a touch switch board, and each of the touch switches is separately electrically connected with a control circuit of the massage chair, wherein the control circuit of the massage chair includes multiple sub-circuits that control at least one of an angle of the chair's backrest and footrest, an intensity of vibration, kneading massage, and heat treatment.

12. The massage chair of claim 11, wherein the control circuit of the massage chair further includes additional sub-circuits that control at least one of a height of the chair, an intensity of massage and a stereo system.

13. A multi-functional touch cooling cup holder, comprising:
a cylindrical cup holder having an annular socket defining a hollow interior space to accommodate a container;
a bended edge at the top of the annular socket, the bended edge having a diameter larger than a diameter of the annular socket;
an edge slot defined by the bended edge and the annular socket;
at least one touch switch on a surface of the bended edge;
a vertical slot in an exterior surface of the annular socket, wherein the vertical slot intersects with the edge slot;
a control circuit within the vertical slot, wherein the control circuit is in electrical communication with the at least one touch switch;
an annular bottom cap at the bottom of the annular socket, wherein the annular bottom cap is separate and distinct from the annular socket;
a thermal radiator installed under the annular bottom cap, the thermal radiator having multiple parallel radiation fins and a cooling fan;
a thermal conductor separate and distinct from the annular socket and not in direct contact with the annular socket, the thermal conductor having an edge embedded in an outer edge of a bore of the annular bottom cap, a top surface exposed to the hollow interior space, and a bottom surface adhered to a cooling side of a thermoelectric cooler, wherein the thermoelectric cooler is installed between the thermal radiator and the thermal conductor, the thermoelectric cooler being electrically connected with the control circuit; and
at least one LED lamp.

14. The multi-functional touch cooling cup holder of claim 13, further comprising a boss at the bottom of the annular socket of the cup holder and an annular LED tube comprising the at least one LED lamp, the boss being equipped with the annular LED tube.

15. The multi-functional touch cooling cup holder of claim 14, wherein the annular LED tube includes LED lamps of at least two different colors, and each of the LED lamps has a separate electric connection with the control circuit.

16. The multi-functional touch cooling cup holder of claim 13, wherein the control circuit includes a power module, a cooling module, a touch panel, a touch control MCU and an output control MCU, the power module being configured to convert an electric supply to an electric voltage required by the MCU and output equipment.

17. The multi-functional touch cooling cup holder of claim 16, wherein the touch control MCU is configured to receive signals from each touch switch and transmit signals to the output control MCU, and the output control MCU is configured to receive the signals transmitted by the touch control MCU and controls operation of the cooling module and the at least one LED lamp.

18. The multi-functional touch cooling cup holder of claim 17, further comprising an LED indicator light associated with each touch switch, the LED indicator light being illuminated when a function associated with a corresponding touch switch is active.

19. The multi-functional touch cooling cup holder of claim 17, further comprising a lock button that disables operation of the at least one touch switch.

20. The multi-functional touch cooling cup holder of claim 19, further comprising a lock indicator light which illuminates when the lock button is active.

* * * * *